3,450,497
PROCESS FOR PRODUCING BORIC OXIDE
Joseph C. Schumacher and Theodore A. Rado, Los Angeles, and James L. Fairchild, Trona, Calif., assignors to American Potash & Chemical Corporation, Los Angeles, Calif., a corporation of Delaware
No Drawing. Filed July 5, 1966, Ser. No. 562,496
Int. Cl. C01b *35/00*
U.S. Cl. 23—149                             6 Claims

ABSTRACT OF THE DISCLOSURE

A process of producing boric oxide from a metal borate by admixing sulfuric acid, a metal fluxing agent comprising alkali metal or alkaline earth metal sulfates or chlorides and a metal borate at a temperature within the range of from about 400° to 1400° C. to form a boric oxide phase which is immiscible with a metal salt phase. The specific composition of the immiscible phases may be varied to predetermined compositions by reacting said acid and said metal borate in equivalent quantities within the range of from 0.1 to 2:1.

---

This invention relates, in general, to methods of producing metallic oxides. More particularly, this invention relates to the production of boric oxide from metal borates including alkali metal borates, alkaline earth metal borates and mixtures of such borates.

As used in the present specification and claims it will be understood that the term "boric oxide" means boron trioxide ($B_2O_3$) and includes compounds variously termed boron oxide, anhydrous boric acid, boric anhydride, and boron sesquioxide having the same composition.

Boric oxide has numerous industrial uses. During recent years there has been a significant expansion of the boron chemical industry with boric oxide becoming a major compound of commerce. Boric oxide has become a prominent oxide for the production of glass, ceramics, cement, paints and pigments. It is an important component of welding and brazing compounds, and of flame-proofing compositions. Boric oxide is also used in the synthesis of boron halides and nitrides. These major industrial applications have created an increased demand for commercial grades of boric oxide.

Heretofore, boric oxide has been produced from naturally occurring metal borate ores by relatively expensive processes requiring several handling operations.

While efforts have been made to develop more direct and less expensive processes for the conversion of metal borates such as alkali metal and alkaline earth metal borates to boric oxide, no completely satisfactory method has thus far been achieved.

Discovery now has been made, however, of a process for the direct and economical conversion of metal borates to boron oxides which eliminates or substantially minimizes the problems attendant to the practice of prior processes.

Broadly, in accordance with the present invention, metal borates are admixed and reacted in an acidic medium comprising at least one acid selected from the group consisting of sulfuric acid, oleum and sulfur trioxide, and subjected to such temperatures, for a sufficient period of time, as will produce a reaction mixture comprising at least two immiscible phases of different density, one comprising a metal salt and the other comprising boric oxide.

In accordance with one preferred embodiment, the process of the present invention is carried out by admixing and reacting a mixture of metal borate and sulfuric acid. An exothermic reaction occurs upon contact of the borate with the acid. Additional heat then is supplied, as required, for a sufficient period of time to drive the reaction to completion with the formation of a molten reaction mixture which readily separates into two phases of different density. These then may be withdrawn, cooled and processed to recover boric oxide therefrom.

In practicing the process of this invention sulfuric acid is contacted with at least one metal borate selected from the group consisting of alkali metal borates and alkaline earth metal borates, including naturally occurring metal borates.

Examples of suitable alkali metal borate starting materials include sodium tetraborate ($Na_2B_4O_7$), sodium pentaborate ($NaB_5O_8$), sodium metaborate ($NaBO_2$) and hydrates thereof and the corresponding borates of potassium, rubidium, cesium and lithium, and hydrates thereof, and the like. These may be used singly or in mixtures of two or more.

Examples of suitable alkaline earth metal borate starting materials include dicalcium diborate ($Ca_2B_2O_5$), calcium diborate ($CaB_2O_4$), tetracalcium decaborate ($Ca_4B_{10}O_{19}$), dicalcium hexaborate ($Ca_2B_6O_{11}$), calcium tetraborate ($CaB_4O_7$), dicalcium decaborate ($Ca_2B_{10}O_{17}$), calcium hexaborate ($CaB_6O_{10}$), dicalcium tetradecaborate ($Ca_2B_{14}O_{23}$) and hydrates thereof, and the corresponding borates of magnesium, strontium and barium, and hydrates thereof, and the like. These may be used singly or in mixtures of two or more.

The invention also is applicable to "metal borates" which are mixtures of alkali metal borates and alkaline earth metal borates. Ulexite ($NaCaB_5O_9 \cdot 8H_2O$) is an example of one such metal borate.

The term "sulfuric acid" as used in the specification and claims means sulfur-containing acids and acid salts which yield, as a reaction product, metal salts which do not chemically decompose at the operating temperatures as well as $SO_3$ in its anhydrous form or any admixture with water in any amount.

When a metal borate compound is contacted with an acidic medium such as sulfuric acid the heat of reaction and supplemental heating result in an essentially quantitative conversion of the metal borate to molten boric oxide and metal salt. Upon completion of the reaction, the molten mixture comprises at least two immiscible phases or layers: one comprising molten boric oxide and another comprising metal salt.

Thus, the surprising discovery has been made that molten boric oxide, normally a fluxing and solubilizing agent, in fact, remains immiscible with the other metal salts formed under the conditions of the process of the present invention wherein a metal borate and acidic medium are contacted and heated. The immiscible phases of product are then readily separated for final processing.

Such final processing of the separate phases may be carried out in conventional equipment providing air cooling or chilling, or the like followed by flaking and bulk packaging. Alternately, the phases may be separated in centrifuges adapted for molten phase operation. Molten product also may be cooled by spraying the same into circulating streams of cold air or through spray chambers containing a chilled liquid. If desired, after phase separation, the molten phases may be directly cooled without physical separation, solidified and thereafter chipped, there being a sharp product boundary present after cooling. Alternately, the molten product may be cast or otherwise converted into shapes of desired configuration and allowed to cool. The boric oxide product thus formed is found to be of high quality and substantially free of dissolved alkaline earth metal salt.

The terms "immiscible phase" or "immiscible layer" as used in the present specification and claims refers to either a liquid-liquid or liquid-solid system.

The process of the present invention may be carried out over a relatively wide range of temperatures. In general, the process yields high purity boric oxide when operated at temperatures within the range of about 400° C. to about 1400° C., preferably within the range of about 900° C. to about 1200° C.

The specific temperature to which any given reaction mixture is heated depends upon the particular starting material chosen and the melting point of the resultant products. Generally, it is only necessary to heat the mixture to that temperature at which the products readily separate into immiscible phases.

In those instances in which a hydrated metal borate is used with concentrated sulfuric acid a rapid exothermic reaction will occur and the temperature of the reaction mixture will rise to about 100° C. with the evolution of a quantity of steam. Thereafter, it is only necessary to apply sufficient additional heat to increase the temperature of the reaction mixture to such an extent that at least two immiscible phases are produced.

Additional heat can be supplied by any standard kiln or furnace or reactor with heating surfaces adequate to maintain the mixture in a molten state. Rotary indirect fired calciners, conventiontl fusion furnaces, brick lined glass furnaces and kilns with a relatively large heating surface per unit of volume are examples of suitable reaction vessels.

When a hydrated metal borate is used as the starting material the highly exothermic reaction resulting from its contact with sulfuric acid may in certain cases lead to caking of the product mixture. Such caking can be substantially overcome or minimized by agitating the mixture during the initial period of addition of sulfuric acid. This agitation may be effected in the furnace itself, prior to application of heat, or in a separate unit such as, for example, a chain mill.

The present process is operative using varying ratios of metal borate to acid. The use of one equivalent of acid for each equivalent of metal ion in the metal borate yields a metal salt comprising mainly metal sulfate. Thus, when one mole (two equivalents) of a metal borate such as hydrated sodium tetraborate is heated with one mole (two equivalents) of sulfuric acid, to a temperature at which two phases form, the process proceeds substantially in accordance with the following equation:

$$Na_2B_4O_7 \cdot xH_2O + H_2SO_4 \rightarrow 2B_2O_3 + Na_2SO_4 + (x+)1H_2O\uparrow$$

Thus, when equimolar amounts of these reactants are so heated the reaction proceeds to completion with the formation of separate immiscible phases consisting of boric oxide and sodium sulfate.

If between two and four equivalents (one to two moles) of sulfuric acid are mixed and heated with each two equivalents (one mole) of sodium tetraborate, fuming occurs in the reaction mixture. It is convenient, therefore, to heat such a mixture to about 400° C. until a two-phase separation occurs, and then heat the resultant boric oxide-containing phase to about 950° C. until a second two-phase separation occurs. The metal salt phases formed are not solely sodium sulfate. Rather, they comprise a mixture of sodium pyrosulfate, sodium bisulfate and sodium sulfate.

If less than two equivalents (one mole) of acid and two equivalents (one mole) of metal borate are heated to a temperature at which two immiscible phases form, the boric oxide phase or layer contains some unreacted metal borate. Such product is desirable for certain applications, such as in glassmaking. It has been found that as little as about 0.1 equivalent of acid can be used per equivalent of metal ion in the metal borate. Thus, by using less than one mole of acid per mole of metal borate it is possible to produce final boric oxide products of varying oxide content as desired for particular applications.

It has been determined that that portion of the metal salt formed according to the process of this invention, which is in the region of the interface with the $B_2O_3$ formed, undergoes some decomposition whereby gaseous sulfur compounds will be evolved and the remaining metal oxide portion of such metal salt will combine with the $B_2O_3$ to increase its alkalinity and provide a product having a purity of less than about 95%. Therefore, to prevent or minimize such decomposition, rapid separation of the phases is preferable. Additionally, such decomposition can be minimized by making certain that the interfacial area between the two phases is kept to a minimum. This readily can be achieved by allowing the immiscible liquid phases to separate as immiscible liquid layers in a separation zone having a relatively small cross-sectional area at the interface level and a relatively large cross-sectional area throughout the remainder of its extent. Such techniques aid in providing a final $B_2O_3$ product of high purity, above 95%, and low alkalinity.

It will be appreciated, that in certain instances, separation of the layers may not be entirely complete whereby the $B_2O_3$ recovered may have some metal salt entrained therewith. Such metal salt conveniently can be removed, in accordance with another aspect of this invention by heating such $B_2O_3$ and entrained metal salts at a temperature of about 950° C. or higher until the metal salt has largely decomposed with the evolution of gaseous sulfur compounds. The period of heating will vary, of course, with the quantity and kind of metal salt that is present. When the metal salt impurity is sodium sulfate a period of heating of from 1 to 4 hours has been found to be adequate to decompose much of the sodium sulfate. The sodium sulfate decomposition is believed to proceed as follows:

$$Na_2SO_4 + 2B_2O_3 \rightarrow Na_2O \cdot 2B_2O_3 + SO_3\uparrow$$

Such heat treatment of the $B_2O_3$-entrained metal salt product is effective in lowering both the sulfate content and the water content of the product. While that product has a slightly increased alkalinity it also has an increased boric oxide assay of at least about 1–2%.

In accordance with one aspect of this invention, particularly satisfactory results are obtained by including a third component in the reaction mixture. When properly chosen such component effectively reduces the melting point of the metal salt formed in the reaction and, surprisingly, also fluxes with that metal salt to increase its fluidity and thereby improve the physical separation of that salt from the molten boric oxide.

Thus, if the starting material is a calcium borate such as colemanite and the acid is concentrated sulfuric acid, upon the addition of a third component or fluxing agent such as sodium chloride or sodium sulfate, the temperature at which the resultant boric oxide and metal salt separate as immiscible molten phases is about 950° C. to 1000° C. In the absence of such fluxing agent, considerably higher temperatures are required to achieve molten phase separation. By reference to phase diagrams for mixed salt systems it is possible to choose various fluxing agents to reduce the maximum operating temperature in accordance with this aspect of the present invention.

In the specification, appended claims and the following examples, all parts and percentages set forth are by weight unless otherwise indicated. These specific examples are intended to illustrate, not limit the invention.

EXAMPLE I

About 1 mole of 100% sulfuric acid is admixed with about 1 mole of sodium tetraborate pentahydrate. Both reactants initially are at room temperature, but the exothermic initial reaction raises the temperature of the mixture to about 100° C. Considerable quantities of water vapor are evolved. The resulting mixture is then heated to about 950° C. for about 30 minutes until the evolution of water vapor ceases. The resultant mixture separates into two immiscible molten layers. The upper molten layer, comprising boric oxide, is tapped off and immediately chilled and flaked. This product is found to have the following composition: 97.0% $B_2O_3$, 1.6% $Na_2O$, 0.7% $SO_3$ and 0.7% water. The lower molten layer, comprising sodium sulfate, is similarly separated, chilled and flaked. It is found to be a crystalline solid of about 99.5% purity with about 0.2% boric oxide and 0.3% sulfuric acid.

EXAMPLE II

A sample of the boric oxide product prepared in Example I is further treated by heating at 950° C. for 3 hours until the evolution of sulfur compounds ceases. The resultant product, upon analysis, is found to have the following composition: 98.3% $B_2O_3$, 1.6% $Na_2O$, 0.1% $SO_3$, and 0.0% water. The product in this example as compared to that of Example I, has a higher $B_2O_3$ assay and a significantly lower content of water and sulfate as $SO_3$.

EXAMPLE III

Example I is repeated using about one mole of sodium tetraborate pentahydrate and about two moles of 100% sulfuric acid. The resulting boric oxide product is found to be similar to that obtained in Example I. The metal salt layer in this example, however, comprises a mixture of sodium pyrosulfate, sodium bisulfate, sodium sulfate and traces of boron compounds, not just sodium sulfate as is obtained in Example I.

EXAMPLE IV

Example I is repeated using about one mole of sodium tetraborate pentahydrate and about 0.5 mole of 100% sulfuric acid. The resulting boric oxide product is found to contain about 78.9% $B_2O_3$, 18.7% $Na_2O$, 1.6% $SO_3$, and 0.8% $H_2O$. This composition corresponds to about 1.0 mole of $B_2O_3$ and 0.5 mole $Na_2B_4O_7$ in the product. The metal salt layer in this example comprises a mixture of sodium sulfate, and sodium borate compounds.

EXAMPLE V

Example I is repeated using about one mole of anhydrous sodium tetraborate ($Na_2B_4O_7$) and about one mole of 100% sulfuric acid. The resulting boric oxide product after a total reaction time of about 16 hours is found to contain 91.3% $B_2O_3$, 6.7% $Na_2O$, and 1.9% $SO_3$. The metal sulfate layer is found to have the following composition: 99.5% $Na_2SO_4$ and 0.5% $B_2O_3$.

EXAMPLE VI

Example I is repeated using about one mole of anhydrous sodium tetraborate ($Na_2B_4O_7$) and about one mole of oleum containing 65% $SO_3$. After a four hour reaction time the resulting boric oxide product is found to contain 88.7% $B_2O_3$, 9.0% $Na_2O$, 1.6% $SO_3$, and 0.7% $H_2O$. The metal sulfate layer is found to contain 99.5% $Na_2SO_4$ and 0.5% $B_2O_3$. Equally satisfactory results are obtained with oleum containing 1–80% $SO_3$.

EXAMPLE VII

About 1.5 moles of 100% sulfuric acid is admixed with about one mole of crude ulexite ore. The temperature of the reactants rises from room temperature to about 100° C. Considerable quantities of water vapor are evolved. The resulting mixture is then heated to about 1100° C. over a 15 minute period. After that time the upper molten layer is tapped off and directly chilled and flaked. This product is found to contain 90.8% $B_2O_3$, 1.6% $Na_2O$, 1.6% $SO_3$, 0.7% CaO, and 1.6% $H_2O$. The lower molten layer is separated and similarly chilled and flaked. The metal salt layer is found to contain 25.3% CaO, 11.7% $Na_2O$, 3.9% MgO, and 59.91% $SO_3$. These inorganic salts are then further processed by conventional separation procedures to yield crystalline commercial grade sodium and calcium sulfate.

EXAMPLE VIII

Examples VII is repeated using the quantities of reactants stated plus 29 grams of $Na_2SO_4$ as a fluxing agent. The resulting mixture is then heated about fifteen minutes at a temperature of about 1000° C. The molten boric oxide product is found to contain 92.7% $B_2O_3$, 1.3% $Na_2O$, 0.5% $SO_3$, 0.1% CaO, and 1.6 $H_2O$. The molten metal salt layer is found to contain 20.9% CaO, 17.3% $Na_2O$, 3.2% MgO, and 58.6% $SO_3$. This example illustrates that the use of a fluxing agent effectively reduces the temperature to which the reaction mixture must be heated to achieve the desired phase separation in the form of molten layers.

EXAMPLE IX

About two moles of 100% sulfuric acid is admixed with about one mole of crude colemanite ore. The temperature of the reactants rises from room temperature to about 100° C. Considerable quantities of water vapor are evolved. A quantity of about 74 grams $Na_2SO_4$ is then added as a fluxing agent. The resulting mixture is heated at about 1000° C. for about 30 minutes. After that time the upper molten layer is tapped off and directly chilled and flaked. The product so obtained is found to contain 87.3% $B_2O_3$, 0.8% $Na_2O$, 0.8% $SO_3$, 0.1% CaO, 2.0% $H_2O$. The lower molten salt layer is separated and similarly chilled and flaked. The metal salt layer is found to contain 22.4% CaO, 14.7% $Na_2O$, 4.0% MgO, and 58.9% $SO_3$. These inorganic salts are then further processed by conventional separation procedures to yield crystalline commercial grade sodium and calcium sulfate. Equally satisfactory results are obtained when the fluxing agent is sodium chloride.

While the invention has been described with respect to what at present are preferred embodiments thereof it will be understood, of course, that certain modifications and variations may be made therein without departing from the scope of this invention as defined in the appended claims.

What is claimed is:

1. In the process of producing boric oxide from a metal borate by admixing sulfuric acid and a metal borate selected from the group consisting of alkali metal borates, alkaline earth metal borates and mixtures thereof at a temperature within the range of from about 400° C. to 1400° C. to form a molten mixture comprising an upper boric oxide phase which is immiscible with a lower metal salt phase and thereafter separating said phases while molten to recover boric oxide, the improvements which comprise varying the specific composition of said immiscible phases to predetermined compositions by varying the ratio of said acid to said metal borate in said admixture within the range of from 0.1 to 2 equivalents of said acid per equivalent of metal ion in said metal borate and including in the initial reaction mixture a third component comprising an amount of a metal salt fluxing agent sufficient to reduce by at least about 100° C. the temperature at which said immiscible phases separate, said metal salt fluxing agent being selected from the group consisting of alkali metal chloride, alkali metal sulfate, alkaline earth metal chloride and alkaline earth metal sulfate.

2. The process as defined in claim 1 in which said admixture contains less than one equivalent of said acid per equivalent of metal ion in said metal borate to produce a boric oxide phase containing predetermined amounts of unreacted metal borate.

3. The process as defined in claim 1 in which said admixture contains more than one equivalent of said acid per equivalent of metal ion in said metal borate to produce a metal salt phase comprising the pyrosulfate, bisulfate and sulfate salts of said metal.

4. The process as defined in claim 1 wherein said alkali metal borate is selected from the group consisting of sodium tetraborate ($Na_2B_4O_7$) and hydrates thereof, sodium pentaborate ($NaB_5O_8$) and hydrates thereof, sodium metaborate ($NaBO_2$) and hydrates thereof, and the corresponding borates of potassium, rubidium, cesium and lithium, and hydrates thereof.

5. The process as defined in claim 1 wherein said alkaline earth metal borate is selected from the group consisting of dicalcium diborate ($Ca_2B_2O_5$) and hydrates thereof, calcium diborate ($CaB_2O_4$) and hydrates thereof, tetracalcium decaborate ($Ca_4B_{10}O_{19}$) and hydrates thereof, dicalcium hexaborate ($Ca_2B_6O_{11}$) and hydrates thereof, calcium tetraborate ($CaB_4O_7$) and hydrates thereof, dicalcium decaborate ($Ca_2B_{10}O_{17}$) and hydrates thereof, calcium hexaborate ($CaB_6O_{10}$) and hydrates thereof, dicalcium tetradecaborate ($Ca_2B_{14}O_{23}$) and hydrates thereof and the corresponding borates of magnesium, strontium and barium and hydrates thereof.

6. The process as defined in claim 1 in which the interfacial area between said immiscible boric oxide and metal salt phases is minimized to thereby minimize decomposition of said metal salt which is in the region of said interface.

References Cited

UNITED STATES PATENTS

| | | | |
|---|---|---|---|
| 1,269,170 | 6/1918 | Faulkner | 23—59 |
| 1,888,391 | 11/1932 | Newman | 23—149 |
| 3,230,042 | 1/1966 | Heinze et al. | 23—145 |

OTHER REFERENCES

Slavyanskii, pages 1 to 8 of translation of "Zhurnal Fizicheskoi Khimii," vol. 30, No. 9, 1956, pp. 2046–2050.

Slavyanskii, pages 1 to 7 of translation of "Zhurnal Fizicheskoi Khimii," vol. 30, No. 10, 1956, pp. 2248–2250.

HERBERT T. CARTER, *Primary Examiner*.

U.S. Cl. X.R.

23—121, 122